United States Patent [19]
Carlsson

[11] 4,200,315
[45] Apr. 29, 1980

[54] DRAWBAR FOR A TRAILER
[75] Inventor: Kaj Carlsson, Singsby, Finland
[73] Assignee: Konetehdas Maskinfabrik Norcar Ky Kb, Finland
[21] Appl. No.: 952,461
[22] Filed: Oct. 18, 1978
[30] Foreign Application Priority Data
Oct. 21, 1977 [FI] Finland ................................. 773132
[51] Int. Cl.² ........................................... B60D 1/00
[52] U.S. Cl. ................... 280/492; 280/404; 280/474
[58] Field of Search ................. 180/51; 280/474, 492, 280/404 R, 405 A, 406 R, 406 A, 489

[56] References Cited
U.S. PATENT DOCUMENTS

| | | | |
|---|---|---|---|
| 1,967,326 | 7/1934 | Raney et al. | 280/492 |
| 2,471,636 | 5/1949 | Martin | 280/474 |
| 3,623,567 | 11/1971 | McKenzie | 280/492 |

FOREIGN PATENT DOCUMENTS
509466 6/1976 U.S.S.R. ................................. 280/492

Primary Examiner—Richard A. Bertsch
Assistant Examiner—Donn McGiehan
Attorney, Agent, or Firm—McGlew and Tuttle

[57] ABSTRACT

A drawbar construction for a semitrailer is provided, by means of which the pulling device, such as a tractor, and the trailer form a rigid vehicle combination. This rigid vehicle combination is applicable especially in loading timber, whereby an effective lifting crane can be mounted on the trailer without the risk of insufficient stability exerted by the laterally extending crane. The drawbar construction comprises a rigid drawbar part extending from the trailer and a connection shaft which connects the rigid drawbar part to the pulling vehicle. The rigid drawbar part and the connecting shaft are interconnected by means of a first joint which is turnable only in the horizontal plane. The second joint connecting the connecting shaft to the pulling device is essentially of the same construction as the first joint but turnable only in the vertical plane. The drawbar construction includes preferably also a rotation joint. The supporting effect of the drawbar to the trailer can be essentially increased by means of a double action hydraulic cylinder, which locks the movement of the drawbar at the second joint in the vertical plane.

6 Claims, 2 Drawing Figures

DRAWBAR FOR A TRAILER

BACKGROUND OF THE INVENTION

1. Field of the Invention

This invention relates to a drawbar construction for a semitrailer which can be connected to a pulling vehicle and is partly supported thereby, e.g. for a tractor connected trailer. According to the invention it is possible also in the case of light tractors and trailers to achieve a vehicle combination which is laterally stable, whereby a laterally extending lifting device, e.g. a crane mounted on the trailer can be used without any additional stud devices. The drawbar construction is applicable especially for timber transporting cross-country vehicles.

2. Description of the Prior Art

For the forest transportation of timber, almost solely different mechanical transport units are used nowadays. This unit usually comprises a lifting device, by means of which the trees felled and delimbed and possibly also cut into predetermined lengths in the forest are loaded onto the transport unit. The lifting device comprises gripping means extending laterally from the transport unit, by means of which gripping means the logs spread on the ground or stacked can be lifted up into the load space of the transport unit.

The difficult working conditions of these equipments have led to the use of large machine units which aim to a large transportation capacity and a good durability also under unfavourable conditions. However, big units have the disadvantage of damaging the terrain, trees and seedlings. During thaw weather and mild winters it may be difficult to use these large and heavy machines on badly supporting ground, as on unfrozen marsh.

In order to avoid the aforementioned difficulties, light transport units have been used, comprising light pulling vehicles provided with endless tracks or the like and suitable for moving over such terrain, connected to suitable semitrailers. Agricultural tractors have also been used as relatively light pulling vehicles for forest transportation.

A disadvantage of these structurally light combinations of pulling vehicle and trailer has been their poor lateral stability during loading. A crane, which is usually mounted on the pulling vehicle, causes a considerable unbalance when a load is lifted from the side up onto the trailer. The unbalance can make the whole transport unit or a part thereof tip over. In the beginning of loading, moreover, the trailer is relatively light and cannot function as a steady support for the lifting means. The crane can be provided with auxiliary studs but the use of such studs in terrain is a complicated and time consuming procedure. The use of extending studs also limits the movement of the vehicle over the terrain. In the case of an agricultural tractor, the lifting device has to be removable, which naturally causes additional expenses and work.

SUMMARY OF THE INVENTION

By means of the invention, it is possible to use a trailer as a support for the crane and to mount the crane on the front part of the trailer, where it may be easily maneuvered from the vehicle cabin. This is achieved by means of a special construction of a drawbar, and especially by means of a special device mounted on the drawbar, which construction enables the vehicle and the trailer to form a stable unit during loading.

An object of the invention is to provide a device for connecting a pulling vehicle and a trailer having a lifting device mounted on the trailer and being operative to engage a load and laterally load the trailer. The device includes a rigid member having one end pivotally connected to the trailer for movement about a vertical axis in a substantially horizontal plane and another end pivotally connected to the pulling vehicle for movement about a horizontal axis in a substantially vertical plane. A fluid pressure telescopic member is provided connected to the pulling vehicle and has a piston operatively connected to the rigid member. The piston is operative to rigidly lock the rigid member to the vehicle thereby forming a rigid connection in a vertical plane between the pulling vehicle and a trailer.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
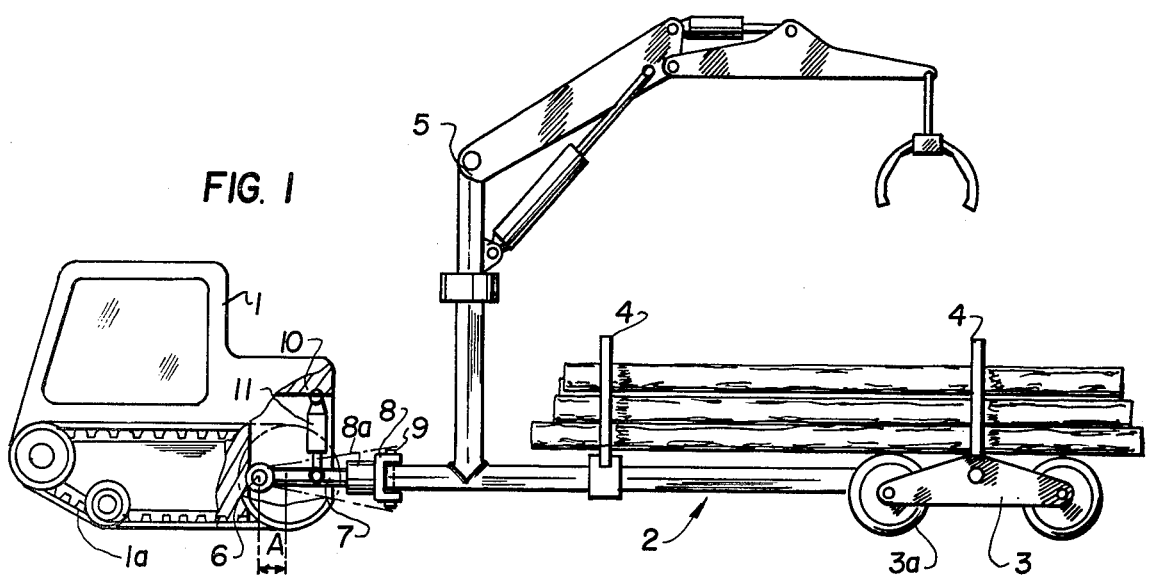
FIG. 1 is a side view of an apparatus including an embodiment of the invention; an FIG. 2 is a top view, partly broken away and partly in section, of an apparatus including an embodiment of the invention.
Figure 2:
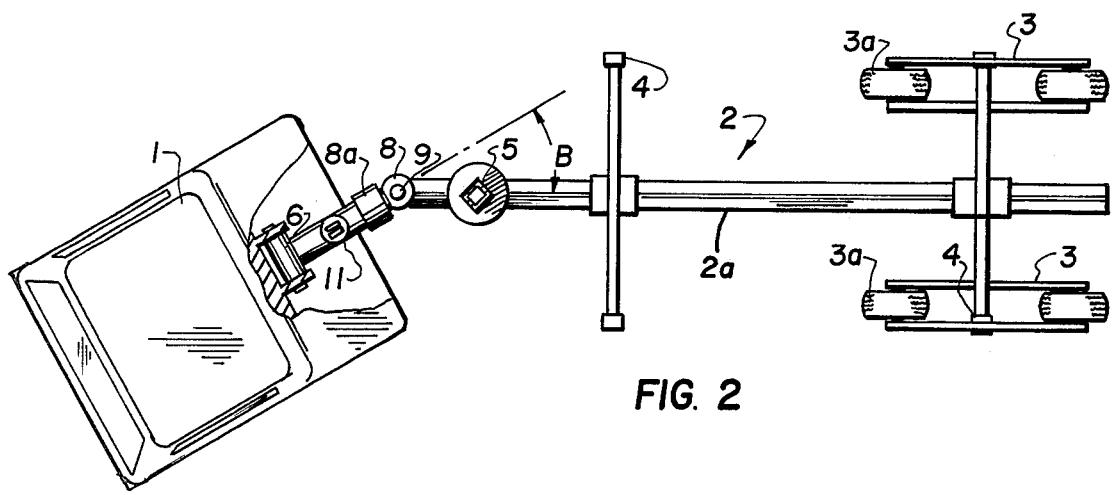

Referring now to FIGS. 1 and 2 in detail. There is shown an embodiment of the invention in which a semitrailer 2 is provided with a forward extending drawbar 2a preferably comprising a tube with a square cross section. In the illustrated embodiment the trailer is intended to be used for timber transportation and its rear end is provided with a bogie 3 with two wheels 3a on either side of the trailer, as well as the usual supports 4. The drawbar 2a is connected to a connecting shaft or link 7 by means of a joint 8. The joint 8 can be of any known construction which allows the parts connected by it to turn in respect to each other only in one plane. In the illustrated construction, the shaft 7 turns only in the horizontal plane in respect to the drawbar 2a. The joint 8 can, for example, comprise a fork like means and a pin 9. The pin 9 thus forms the axis around which the relative turning movement in the horizontal plane between the pulling vehicle and the trailer takes place. The connecting shaft 7 is further connected to the pulling device or tractor by means of a joint 6. The relative vertical movement between the pulling vehicle and the trailer which is necessary for driving in terrain, takes place at this joint 6, which in principle is of similar construction as the joint 8, but allows turning only in the vertical plane. In the embodiment illustrated in FIG. 1, the joint 6 is located in the pulling vehicle at a distance (A) ahead of its rear wheel axle. It here being the question of cross-country vehicles some relative twisting movement must be also allowed between the tractor and the trailer. This is achieved by means of the turning or rotation joint 8a adjacent the joint 6 in a casing protruding from joint 8, which also is of known construction and allows only a turning movement, but no axial displacement between the connected parts. A crane 5 having a laterally extendible boom, is mounted on the drawbar intermediate the loading space in the trailer, and the joint 8.

During loading, a pulling vehicle on the tractor 1 and the trailer or semi trailer 2 are positioned in the manner shown in FIG. 2 so that the connecting shaft 7 and the drawbar 2a form an angle B, i.e. the connecting shaft 7 extends at said angle B from the drawbar. By means of the joint 8, which is rigid in the vertical plane, the connecting shaft 7 thereby gives a support for the drawbar 2a, whereby the weight of the tractor provides an effective counter-force against the torsional force exerted by the crane 5 on the drawbar 2a. The connecting shaft 7 thus attempts to either lift or lower the rear part of the pulling vehicle at the point of connection of the joint 6, which point is preferably somewhat in front of the rear wheel axis. The best lateral support is naturally obtained when the angle B is 90°.

The supporting effect of the connecting shaft 7 may be substantially improved according to the invention by means of a double-acting hydraulic cylinder 11 provided between the shaft 7 and connected to the tractor (e.g. at 10). When a static pressure is applied to both sides of a cylinder piston, the pressure locks the piston and the shaft 7 in the vertical plane in relation to the joint 6. Thereby locking the tractor in its vertical position in relation to the drawbar and the trailer. During loading, the vertical position of the tractor may change e.g., if the ground gives away under the front or rear part of the tractor. In this case the position of the shaft 7 in the vertical plane may be corrected to correspond to the new position of the tractor by momentarily releasing the pressure in the cylinder 11, and then by reapplying the pressure, whereby the loading may continue. The shaft 7, locked by the cylinder 11, forms in this way a rigid connection extending from the tractor, which gives the drawbar 2a in the joint 8 both an excellent vertical support and an improved support against the torsional forces exerted by the crane. When the tractor is moving the hydraulic cylinder is unpressurized so that the drawbar 2a and the shaft 7, respectively, can move in the vertical plane around the joint 6.

By means of the drawbar construction according to the invention, an extremely rigid connection between the pulling vehicle and the trailer is achieved during loading. Thus, even in the case of a light tractor and trailer combination, it is possible to use an effective crane mounted on the trailer of the unit, without the risk of insufficient stability.

Although the invention has been described above in connection with the drawbar of the trailer, it is of course conceivable to form the modified part of the drawbar as a part of the pulling vehicle. When the pulling vehicle 1 is intended only for forestry work and thus being constructed as a cross-country vehicle, preferably provided with endless tracks or the like, it is possible to build the connecting shaft 7 with the joint 6 into the vehicle. Also in this case the trailer can suitably be disconnected from the pulling vehicle at the joint 8, for example by pulling out the pin 9. Also the crane is easily disconnectable from the pulling vehicle by means of quick couplings.

While specific embodiments of the invention have been shown and described in detail to illustrate the application of the principles of the invention, it will be understood that the invention may be embodied otherwise without departing from such principles.

I claim:

1. A device for connecting a pulling vehicle and a trailer having a lifting device mounted on the trailer and being operative to engage a load and laterally load the trailer, comprising a rigid member having one end pivotally connected to said trailer for movement about a vertical axis in a substantially horizontal plane and another end pivotally connected to said pulling vehicle for movement about a horizontal axis in a substantially vertical plane, a fluid pressure telescopic member connected to said pulling vehicle having a portion operatively connected to said rigid member, said piston being operative to rigidly lock said rigid member in selective positions to said vehicle thereby forming a rigid connection in a vertical plane between said pulling vehicle and said trailer.

2. A device according to claim 1 wherein said trailer includes a single draw rod having a first end pivotally connected to said rigid member, a cross axle connected to a second end of said draw rod, and at least one wheel rotatably connected to each end of said axle, and said lifting device being mounted on said draw rod adjacent said first end.

3. A transport unit comprising, in combination, a pulling vehicle, a trailer interconnected with said vehicle, a lifting device mounted on said trailer and being operative to engage a load and laterally load said trailer, a rigid member, a first joint member connected to one end of said rigid member and said trailer for pivoting at least a part of said rigid member in a substantially horizontal plane about a vertical axis, a second joint member connected to another end of said rigid member for pivoting at least a part of said rigid member in a substantially vertical plane about a horizontal axis, a hydraulic cylinder connected to said vehicle and having a piston operatively connected to said rigid member, said piston being operative to rigidly lock said rigid member in selective positions to said vehicle thereby forming a rigid connection in a vertical plane between said vehicle and said trailer.

4. A transport unit according to claim 3, wherein said trailer includes a tubular member extending from said trailer and connected to said first joint member, said lifting device being mounted on said tubular member.

5. A transport unit according to claim 3, wherein said pulling vehicle includes an endless track, a forward axle and a rear axle, mounting means associated with said axle for mounting said endless track, and said second joint member being connected to said pulling vehicle intermediate said forward and rear axles.

6. A transport unit according to claim 3, wherein said hydraulic cylinder includes means for applying a static pressure to said piston to lock said piston and said rigid member.

* * * * *